United States Patent [19]

Mieth

[11] Patent Number: 4,458,543

[45] Date of Patent: Jul. 10, 1984

[54] CLEANABLE SAMPLING VALVE

[75] Inventor: Hans O. E. Mieth, Hamburg, Fed. Rep. of Germany

[73] Assignee: Otto Tuchenhagen GmbH & Co. KG, Fed. Rep. of Germany

[21] Appl. No.: 349,704

[22] Filed: Feb. 18, 1982

[30] Foreign Application Priority Data

Feb. 27, 1981 [DE] Fed. Rep. of Germany ....... 3107429

[51] Int. Cl.³ .......................... G01N 1/10; F16K 1/44
[52] U.S. Cl. .................................. 73/863.86; 137/240
[58] Field of Search ....................... 73/863.86, 863.84; 137/240

[56]  References Cited

U.S. PATENT DOCUMENTS

| 1,724,017 | 4/1929 | Godfrey ........................... 137/240 X |
| 3,517,688 | 6/1970 | Scholle ................................ 137/240 |
| 4,194,524 | 3/1980 | Wicke .................................. 137/240 |
| 4,344,453 | 8/1982 | Tuchenhagen et al. ............. 137/240 |

FOREIGN PATENT DOCUMENTS 2070769 9/1981 United Kingdom ............. 73/863.86

OTHER PUBLICATIONS

Publ. "In Line Relief & Sampler Head Assemblies" Welker Engineering Co., 9 pages.

Primary Examiner—Daniel M. Yasich
Attorney, Agent, or Firm—Lane, Aitken & Kananen

[57]  ABSTRACT

The invention relates to a cleanable sampling valve to be incorporated into the product line supplying the samples. With such a valve, it is ensured that repeated sampling during one long-time product charge passage will take place under optimum sterile conditions and any entrainment of product into the sealing area and the consequent risk of reinfection emanating from that area will be precluded. In addition, it is ensured that no intermixing of the product or the product sample with the cleaning or disinfecting agent will be possible. The sampling valve includes, inter alia, a closing member (5) having the form of a hollow cylinder and prestressed against a housing seat surface (3a), the cylinder bore (15) of said closing member (5) being open to a spring housing and stuffing box shell (4) in the closed position of the sampling valve and being closed in the open position through a controlling clearance (22) by means of a lower valve stem seal (23) while controllable reflief bores (18a) connect the interior of the spring housing and stuffing box shell (4) to the atmosphere (FIG. 2).

7 Claims, 2 Drawing Figures

CLEANABLE SAMPLING VALVE

BACKGROUND OF THE INVENTION

The invention relates to a cleanable sampling valve to be incorporated into the product line supplying the samples, with a sample duct branching off from the valve housing through a sample bore, a closing element controlling the sampling through the sample bore, and a stuffing box shell which seals a valve stem that projects from the valve housing.

The invention is of importance principally for product-carrying installations and plants of the beverage industry, where it is necessary, for example, to take sterile samples from product lines for inspection and control of the process.

It is known to weld the housing of a sampling valve into the product line so as to fully integrate the sampling valve within the product line. The valve housing has an opening at its bottom for the removal of the samples, which opening can be closed by means of a closing element with a metallic seal.

The operation of the closing element is effected from the top of the sampling valve by means of a valve stem or spindle extending across the product space and being guided through a stuffing box shell to project from the valve housing, the valve spindle being thus exposed to the product and cleaning agent flowing around it within the valve housing. The valve seat is of the metallic sealing type and can therefore wholly be flame treated.

With the known valve, sterile sampling is possible if prior to the taking of the sample the sample outlet has been cleaned through the product line filled with cleaning agent and subsequently flame treated, the sampling valve being open during this procedure.

The known sampling valve does not permit repeated sampling during one product charge passage under sterile conditions. Although the known valve is equipped with a sight lantern between the valve housing and the valve actuating means, this valve—like, in principle, all other similarly constructed and equipped valves—provides no absolute safety against reinfection as the valve stem, during the switching of the valve, carries the product adhering thereto into the stuffing box area within the valve housing. The remains of product displaced in this way are as a rule incapable of being removed by automatic flow-through cleaning from the product line and thus constitute at least a possible source of reinfection.

BRIEF SUMMARY OF THE INVENTION

It is an object of the invention to provide a cleanable sampling valve of the type indicated hereinbefore which permits repeated sampling during one long-time product charge passage under optimum sterile conditions and with which the risk of entrainment of product into the sealing area and the consequent risk of reinfection emanating from that area is eliminated.

This object is accomplished by the features according to the invention.

The proposed sampling valve is distinguished by the advantages set forth hereinafter. All internal valve surfaces separated from the product space by the closing member or element can be cleaned during the passage of the product charge in the product line as often as desired by introducing a cleaning or disinfecting agent through the connecting opening in the spring housing and stuffing box shell. Whenever a sample is taken, the closing element is moved into the cleaned spring housing and stuffing box shell so that no germs can be brought from the latter into the product space. An introduction of germs by the valve stem into the sealing area of the latter is also prevented since during the taking of the sample, the cylinder bore within the closing element which receives the valve stem is sealed off from the product space by means of the lifting and closing element. If any of the product should yet get to the valve stem when in its upper lift position while the sampling valve is open, the product residues will, during the subsequent closing movement of the sampling valve, temporarily remain within the cylinder bore of the closing element and will not be carried into the sealing area of the valve stem; rather, they will be removed during the subsequent cleaning operation and carried off through the sample outlet.

It is advantageous to accomplish the closing movement of the closing element in that, according to one embodiment of the sampling valve, the boundary surface of the closing element at the end terminating in the spring housing and stuffing box shell is directly acted upon by a helical pressure spring and that the opening movement of the closing element is limited by the latter coming into abutment with the inner hub portion of the spring housing and stuffing box shell. Thereby, the spring and the end boundary surface lie within the cleaning area.

In addition, further developments of the sampling valve according to the invention are provided on the one hand to ensure that the valve housing is spatially separated from the casing of the valve actuating means and, on the other hand, to prevent in any case an intermixing of the product or the product sample with the cleaning or disinfecting agent even in the event of a controlling error or misrouting of the cleaning or disinfecting agent.

According to one advantageous development of the sampling valve, the spatial separation of the sampling valve from the casing of the valve actuating means is accomplished in that the end of the closing element facing the spring housing and stuffing box shell is sealingly connected to a piston valve element, the piston valve element being axially guided by means of its outer side wall surface within the spring housing and stuffing box shell and being also sealed with respect to the latter. The piston valve element establishes through the axial bore provided therein a connection between the cylinder bore and the interior of the spring housing and stuffing box shell. Furthermore, in that the valve stem is rigidly connected to the spring housing and stuffing box shell and sealed from the surrounding thereof. The valve stem is in connection with a drive or actuating means which is connected to the valve housing through a lantern housing surrounding the spring housing and stuffing box shell.

The visible separation of the valve housing and the valve actuator housing by means of an interposed lantern housing makes it possible in a given case to detect leakages from the valve housing as well as from the spring housing and stuffing box shell at an early stage.

With a sampling valve spatially separated into a valve housing and a valve actuator housing by a lantern housing, intermixing of the product or the product sample with cleaning or disinfecting agent is prevented with certainty by the fact that, according to another advantageous development of the sampling valve, the piston valve element has at least one relief bore extending through its outer side wall surface and located above the piston valve seal. The relief bore leads to the interior of the spring housing and stuffing box shell, wherein, in the open position (i.e., the sampling position) of the sampling valve, the relief bore establishes a connection between the interior of the spring housing and stuffing box shell and the atmosphere a controlling clearance, provided between the valve stem and the bore in the piston valve element and connecting the interior of the spring housing and stuffing box shell with the cylinder bore, is closed by a lower valve stem seal.

This arrangement ensures that even in the event that the seat surface between the closing element and the lifting and closing element is damaged, no intermixing of hostile fluids over the damaged seat surface will occur when in the open position of the valve, and when cleaning or disinfecting agent is present under pressure in the spring housing and stuffing box shell. This occurs since the cylinder bore leading to the damaged seat surface is closed at its inlet, namely, at the controlling clearance between the valve stem and the borehole in the piston valve element. In the described open position, the interior of the spring housing and stuffing box shell is simultaneously connected to the atmosphere through a relief bore or a plurality of relief bores. Any possibly wrongly controlled cleaning or disinfecting agent may thus leave the spring housing and stuffing box shell in this way.

In order to ensure clear pressure and flow conditions in all valve positions between the defined end positions with maximum safety at all events throughout the entire valve apparatus even in the event of a wrong control of the cleaning or disinfecting agent, the valve is provided according to another advantageous development of the sampling valve with a relative lift displacement c between the piston valve element and the spring housing and stuffing box shell that is necessary to establish a connection between the interior of the spring housing and stuffing box shell and the atmosphere. The left displacement c is smaller than the relative lift displacement a between the valve stem and the piston valve element necessary for closing the controlling clearance by the lower valve seal. The maximum relative lift displacement b between the valve stem and the closing element is greater than the relative lift displacement a.

By the relative lift displacements dimensioned as stated above, it is achieved on the one hand that, during the opening movement of the sampling valve, the relief bore will become effective before the controlling clearance is closed, and subsequently, the lifting and closing element will come into abutment on the closing element. On the other hand, it is ensured that in the closing movement of the sampling valve the relief bore will be closed completely only when the closing element has come to rest on its seat with full closing force and after the controlling clearance has previously been opened completely.

Another advantageous development of the sampling valve provides that, in the closed position of the sampling valve, a piston valve bore having recesses on its circumference in the lower portion thereof surrounds the lower valve stem seal in pressure-locking contact therewith and that, in the open position of the sampling valve, the spring housing and stuffing box shell being provided at its lower end with recesses distributed over its inner circumference, surrounds the upper piston valve seal in pressure-locking contact therewith.

By this measure, it is ensured that the sealing member, which in the given valve position is not in sealing contact, will not be completely exposed in a radially outward direction, but rather will be safely fixed in its respective groove by being partially embraced in pressure-locking contact. Damage to the sealing means by shearing is thereby excluded to the utmost extent.

If it is desired to provide for automatic sampling, the lifting motion of the valve stem of the sampling valve according to the invention can be produced through known per se, fluid pressure operated or motor-driven lifting means or devices.

BRIEF DESCRIPTION OF THE DRAWINGS

In the following, the cleanable sampling valve will be described more specifically, by way of example, by two embodiments, reference being made to the drawing in which.

DETAILED DESCRIPTION OF THE PREFERRED EMBODIMENTS

Figure 1:
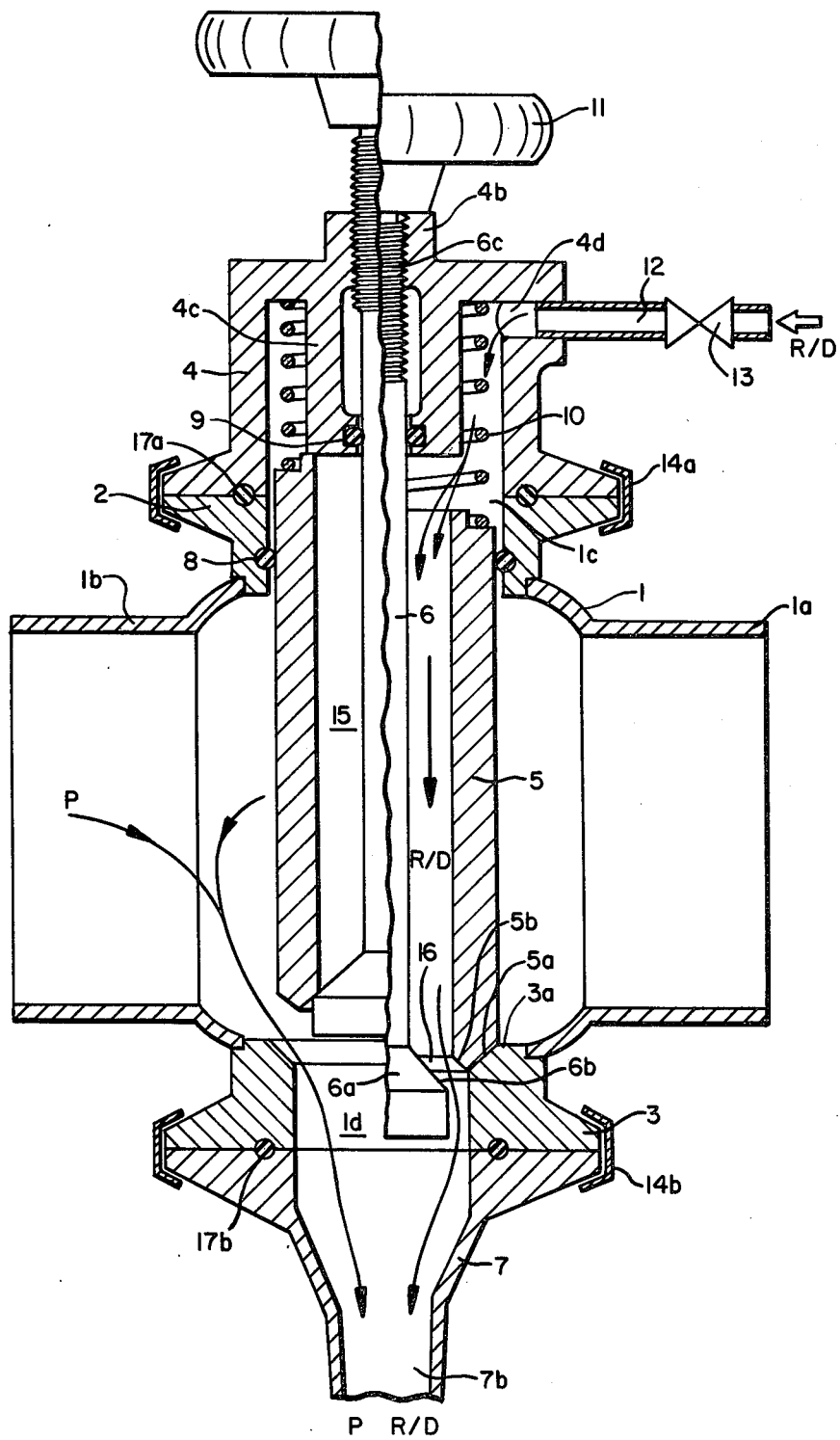
FIG. 1 is an axial section through the cleanable sampling valve according to the invention showing, to the left of the center line, the sampling valve in its sampling position and showing, to the right of the center line, the sampling valve in its cleaning position.

According to FIG. 1, the cleanable sampling valve, on the part of the housing, preferably comprises a spherical valve housing or body 1 with pipe or duct connection portions 1a, 1b, an upper housing flange 2, and a sample tap flange 3. The two last-mentioned flanges are connected to the valve housing 1 in an axially aligned and diametrically opposed relationship. A spring housing and stuffing box shell 4 is connected to the upper housing flange 2 by upper connecting means 14a, and a sample discharge portion 7 is connected to the sample tap flange 3 by lower connecting means 14a. The upper and lower flange connections are each provided with a sealing ring 17a or 17b of which the lower one must, if necessary, be of a type permitting flame treatment or flame cleaning of the sample discharge portion 7 of the sampling valve.

Arranged inside the valve housing 1 is a closing element 5 structured in the form of a hollow cylinder. The closing element 5 is guided in the lifting direction in a connecting bore 1c to the spring housing and stuffing box shell 4 and is sealed with respect to the interior of the valve housing 1 by means of the housing seal 8. The end boundary surface of the closing element 5 that faces the sample tap flange 3 is provided with outer and inner seat surfaces 5a, 5b. The outer seat surface 5a corresponds to the seat surface 3a of the sample tap flange 3 and the inner seat surface 5b corresponds to the seat surface 6b of the lifting and closing element 6a. The lifting and closing element 6a is arranged to adjoin the end boundary surface of the closing element 5 and is connected to the valve stem 6 which extends concentrically through the cylinder bore of the closing element 5. In the closed position of the sampling valve, the lifting and closing element 6a is substantially received within the sample bore 1d of the sample tap flange 3. The sample bore 1d has a continuation through the sample outlet 7b within the sample discharge portion 7.

The valve stem 6, at its end remote from the lifting and closing element 6a, is guided within the inner hub portion 4c and out of the spring housing and stuffing box shell 4. The sealing thereof is effected by the valve stem seal 9. Above the sealing point, the valve stem 6 has a threaded portion 6c which is screwed into the external hub 4b provided with corresponding threads. The valve stem actuating means is in the form of a handwheel 11. Located within the spring housing and stuffing box shell 4 is a spring 10 which bears, at one end, against the bottom of the spring housing and stuffing box shell 4 and, at the other end, against the boundary surface of the closing element 5 at the end thereof terminating in the housing and stuffing box shell 4. Directly under the bottom or base portion of the spring housing and stuffing box shell 4, the latter is provided with a connecting opening 4d for cleaning and disinjecting agent which is connected with a pipe 12. The pipe 12 is equipped with a shutoff device 13.

The showing to the right of the center line of the sampling valve illustrates the sampling valve in its cleaning position. In this position, the valve stem 6 is screwed down into the sampling valve to its stop on the hand wheel 11. Between the closing member 5, which has its outer seat surface 5a abutting on the seat surface 3a of the sample tap flange 3, and the seat surface 6b of the lifting and closing member 6a, there is provided an annular clearance 16. The annular clearance 16 is defined on the side of the closing element 5 by the inner seat surface 5b and has an extension therebelow between the sample bore 1d and the substantially cylindrical wall surface of the lifting and closing element 6a. When the shutoff device 13 is open, the cleaning or disinfecting agent R or D flows through the pipe 12 and the connecting opening 4d into the spring housing and stuffing box shell 4 and passes from there through the cylinder bore 15 within the closing element 5 and through the annular clearance 16 into the sample bore 1d. The remains of product preferably adhering to the surfaces in this area are cleaned off and brought outside the sampling valve through the sample outlet 7b. In FIG. 1, the flow of the agent is shown by the arrows to the right of the center line.

For sampling, the valve stem 6 is screwed upwardly and this movement will first bring the lifting and closing element 6a with its seat surface 6b into abutment with the inner seat surface 5b of the closing member 5. By further upward movement of the lifting and closing element 6a the closing element 5 is also brought into its open position in opposition to the force of the spring 10. In this position, the upper lift position of the closing element 5 is defined by the inner hub portion 4c of the spring housing and stuffing box shell 4 on which the end boundary surface of the closing element 5 comes into abutment. The product P then passes from the valve housing 1 through the annular clearance between the seat surface 3a of the sample tap flange 3 and the outer seat surface 5a of the closing element 5 into the sample outlet 7b. It is thus not possible for product P to get into the cylinder bore 15 since this space is sealed with respect to the product space by the lifting and sealing member 6a abutting with its seat surface 6b on the inner seat surface 5b of the closing element 5. There is also no possibility of reinfection of the product space during the subsequent closing movement of the closing element 5 as the latter, during the opening movement for sampling, was retracted into the cleaned spring housing and stuffing box shell 4. The flow of the product P is shown by the arrows to the left of the center line of FIG. 1.

Figure 2:
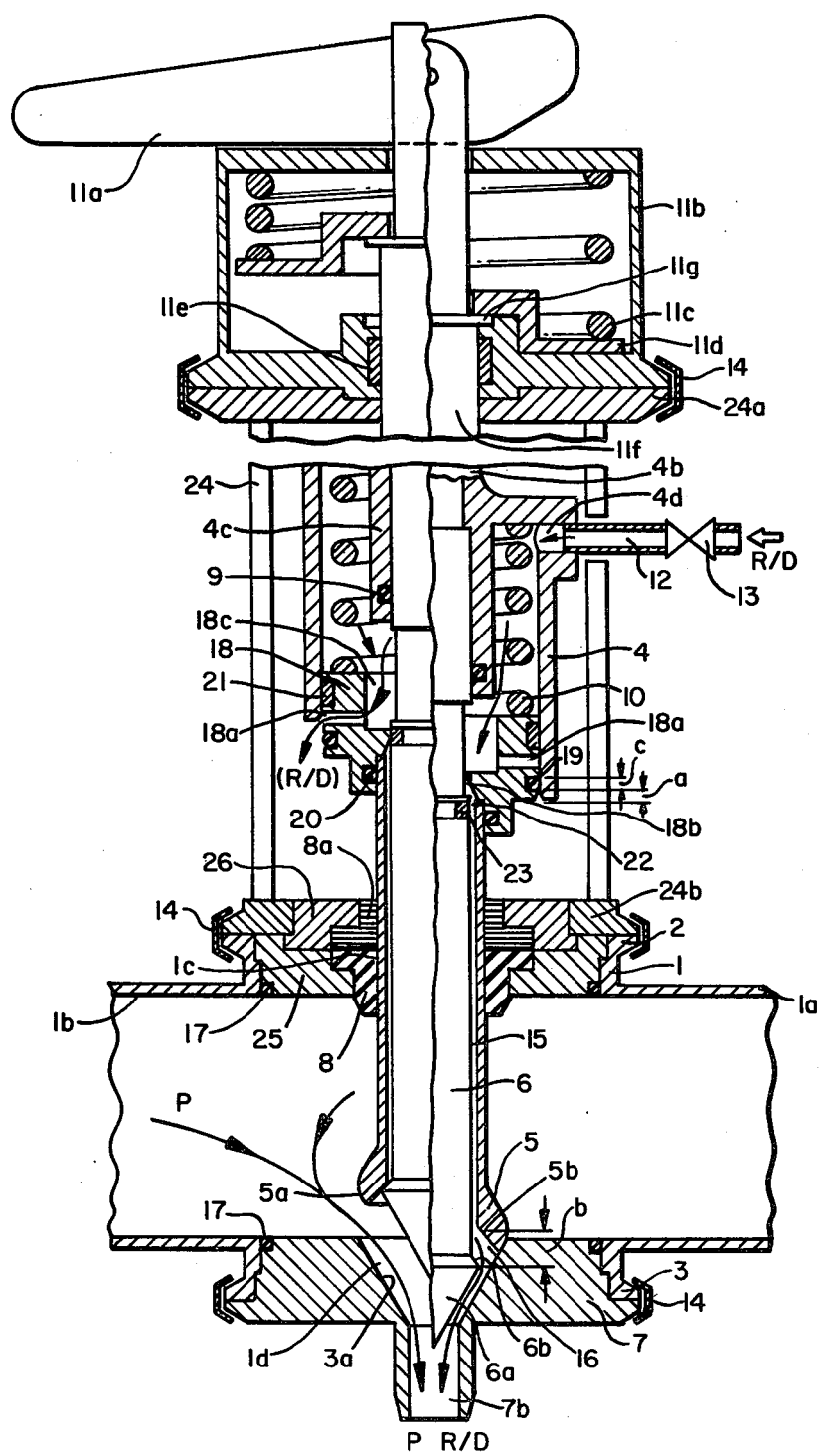
FIG. 2 is an axial section through a development of the cleanable sampling valve according to the invention showing, to the left of the center line, the sampling valve in its sampling position and showing to the right of the center line, the sampling valve in its cleaning position.

FIG. 2 shows another advantageous embodiment of the sampling valve. All structural elements of this sampling valve which have counterparts corresponding thereto in arrangement and basic function in the sampling valve according to FIG. 1 as described above have been given the same reference numerals and designations as the structural parts according to FIG. 1. This applies particularly to the following elements: the valve housing 1, the pipe connection portions 1a and 1b, the sample bore 1d, the upper housing flange 2, the sample tap flange 3, the closing element 5 with the outer seat surface 5a and the inner seat surface 5b, the valve stem 6 with the lifting and closing member 6a and the seat surface 6b, the sample discharge part 7 with the sample outlet 7b, the pipe 12 for cleaning and disinfecting agent, the shut-off device 13, the connecting means 14a and 14b, the cylinder bore 15, and annular clearance 16.

The essential difference in the sample valve according to FIG. 2 from that of FIG. 1 resides in the fact that the closing member 5, which passes out of the valve housing 1 through a housing seal 8 and a guide means 8a adjoining said seal is sealedly connected at its end facing the spring housing and stuffing box shell 4 to a piston valve member 18. The piston valve member 18 is axially guided, by its outer wall surface, within the spring housing and stuffing box shell 4 and is also sealed with respect to the latter. The piston valve member 18 has a central bore 18b through which its provides a connection between the cylinder bore 15 and the interior of the spring housing and stuffing box shell 4. Sealing of the piston valve member 18 within the spring housing and stuffing box shell 4 is provided by the upper piston valve seal 19; sealing of the piston valve member 18 with respect to the closing element 5 is provided by the lower piston valve seal 20. Proper guiding of the piston valve member 18 within the spring housing and stuffing box shell 4 is ensured by the guide ring 21. The valve stem 6 is rigidly connected to the spring housing and stuffing box shell 4, sealing of the interior of the spring housing and stuffing box shell 4 with respect to the atmosphere being provided for by the upper valve stem seal 9 in the inner hub portion 4c. The spring 10 abuts at one end against the bottom of the spring housing and stuffing box shell 4 and at the other end against the piston valve member 18. Located in the upper portion of the spring housing and stuffing box shell 4 is the connecting opening 4d for cleaning or disinfecting agent, preferably with tangential entry into the interior of the housing. Contrary to the arrangement provided with the sampling valve according to FIG. 1, the valve housing seal 8, by which the closing element 5 is led out of the valve housing through the opening 1c is supported by means of a lower housing insert 25 in the valve housing 1. This lower housing insert 25 also takes up a seal 17 which is provided also, in a similar form, in the sample discharge portion 7 and provides for proper sealing of the structural parts on the housing.

The guide means 8a, which takes up the closing element 5 through its opening 1c, is mounted in an upper housing insert 26 which in turn is centered in the lower housing insert 25 as well as in the lower lantern housing flange 24b. A lantern 24 equipped with lower and upper lantern housing flanges 24b, 24a provides for spatial separation of the valve housing 1 from a manually operated actuator arrangement which is known per se in its structure and consists of the hand lever 11a, the actuator housing 11b, the upper spring 11c, the spring plate 11d, the guide means 11e, the actuating rod 11f and the collar 11g. The actuating rod 11f is rigidly connected to the spring housing and stuffing box shell 4 through the outer hub 4b of the spring housing and stuffing box shell 4.

In the open position (sampling position) of the i.e., the sampling valve, an annular controlling clearance 22 formed between the piston valve bore 18b and the valve stem 6 is closed through the lower valve stem seal 23 within the valve stem 6. The piston valve bore 18b is enlarged in the direction towards the interior of the spring housing and stuffing box shell 4 through a recess 18c. In the open position of the sampling valve, relief bores 18a which extend through the outer side wall surface of the piston valve member 18 above the piston valve seal 19 provide for a connection of the interior of the spring housing and stuffing box shell 4 to the atmosphere.

In the closed position of the sampling valve (shown on the right hand side in FIG. 2) the sampling valve can be cleaned and disinfected. The cleaning or disinfecting agent enters the interior of the spring housing and stuffing box shell 4 via the shut-off means 13, the pipe 12 for cleaning and disinfecting agent and the connecting opening 4d for cleaning and disinfecting agent and flows from there through the controlling clearance 22, the cylinder bore 15, the annular clearance 16 and the sample outlet 7b. Thus, all valve parts that come into contact with the product during sampling are cleaned and disinfected in a flow-through process.

In the open position (sampling position) of the sampling valve, the cylinder bore 15 is closed with respect to the product space by the closing element 5 resting on the seat surface 6b of the lifting and closing member 6a. Furthermore, the inlet opening to the cylinder bore 15 provided by the controlling clearance 22 is sealed by the lower valve stem seal 23. The interior of the spring housing and stuffing box shell 4 is connected to the atmosphere through the relief bores 18a so that it will be prevented in any case that misrouted cleaning or disinfecting agent will be present under pressure in the interior of the spring housing and stuffing box shell 4. Even in case of a damaged seat surface 6a, it is ensured by the sealing through the lower valve stem seal 23 in the area of the controlling clearance 22 that no cleaning or disinfecting agent can get into the product space or into the sample.

The relative lift displacements a, b, c indicated in FIG. 2 are defined as follows:

The relative lift displacement a is the distance the upper edge of the lower valve stem seal 23 must travel in order just to close the controlling clearance 22. The relative lift displacement b is the maximum distance the lifting and closing member 6a must travel from the closed position of the sampling valve to get into abutment on the closing element 5. The relative lift displacement c is the distance the spring housing and stuffing box shell 4, and consequently also the valve stem 6, must travel from the closed position of the sampling valve in order that the upper piston valve seal 19 within the piston valve member 18 will just establish a connection between the interior of the spring housing and stuffing box shell 4 and the atmosphere. By dimensioning the relative lift displacements to be $b > a > c$, it is ensured on the one hand that the supply of cleaning or disinfecting agent through the controlling clearance 22 is shut off before sampling can take place by lifting of the closing element 5 and, on the other hand, it is achieved that the relief bores 18a will remain open for the time required for the closing element 5 to come into full seating contact with maximum force on its outer seat surface 5a.

Due to the condition $a > c$, it can never happen that, for example, misrouted or wrongly controlled cleaning or disinfecting agent under pressure passes through the controlling clearance 22 into the cylinder bore 15, for the relief bores 18a are already closed through the spring housing and stuffing box shell 4.

The switching operation of the sampling valve described by reference to FIG. 2 can easily be automated if the lifting movement of the valve stem 6 is produced through fluid pressure operated or motor actuated lifting devices which are known per se.

I claim:
1. A cleanable sampling valve for a product line for supplying samples of the product, comprising:
   a valve housing for connection to a product line, including a movable closing element having a connection bore, and said valve housing having a sample bore for selective connection to a sampling duct for sampling the product in the product line, and the valve housing further defining a product space therein;
   a spring housing and stuffing box shell sealingly secured to the valve housing and including a valved connecting means for receiving a cleansing agent, and further including a spring biasing means therein;
   said closing element controlling the sampling product discharging through the sample bore, by selective movement of said closing element within the connection bore of the valve housing in a direction toward and away from the sample bore of the valve housing and in a sealed relationship to the product space of the valve housing, an a first of the closing element remote from the sample bore terminating within the spring housing and stuffing box shell, a second end of the closing element being biased by the biasing means against a housing seat surface which defines the sample bore, the closing element defining a cylinder bore therethrough open to the spring housing and stuffing box shell;
   a lifting and closing member within the cylinder bore and connected to a valve stem which projects outwardly beyond the spring housing and stuffing box shell, the lifting and closing member adjoining a lower surface of the second end of said closing element so as to effect simultaneously an opening movement of the closing element and a sealing of the cylinder bore of the closing element relative to the product space of the valve housing and the sample bore;
   whereby, when the valve is in the closed position, a cleansing agent passes through the spring housing and stuffing box shell, through the bore in the closing element, and to the sample bore without contact with the product.
2. A cleanable sampling valve as set forth in claim 1 wherein the end of the closing element terminating within the spring housing and stuffing box shell includes a boundary surface directly acted upon by the biasing means in the spring housing and stuffing box shell so that during an opening movement of the closing element from its closing position, the end boundary surface abuts an internal hub portion of the spring housing and stuffing box shell.

3. The cleanable sampling valve as set forth in claim 1 further including a piston valve member sealingly connected to an end of the closing element facing the spring housing and stuffing box shell, an outer side wall surface of the piston valve member being axially guided within and sealed relative to the spring housing and stuffing box shell, the piston valve member including a central bore connecting the bore of the closing element and the interior of the spring housing and stuffing box shell, the valve stem being rigidly and sealingly connected to the spring housing and stuffing box shell; and actuator means connected to the valve stem and the valve housing.

4. The cleanable sampling valve as set forth in claim 3 further including a lantern housing surrounding the spring housing and stuffing box shell.

5. The cleanable sampling valve as set forth in claims 3 or 4 wherein the piston valve member includes at least one relief bore extending through an outer side wall of the piston valve member above a seal for the piston valve, the relief bore leading to the interior of the spring housing and stuffing box shell wherein, when the sampling valve is in an open or sampling position, the relief bore establishes a connection between the interior of the spring housing and stuffing box shell and the atmosphere and an annular controlling clearance between the valve stem and the piston valve bore connecting the interior of the spring housing and stuffing box shell with the cylinder bore is closed by a lower valve stem seal.

6. A cleanable sampling valve as set forth in claim 5 wherein a first relative lift displacement between the piston valve member and the spring housing and stuffing box is smaller than a second relative lift displacement between the valve stem and the piston valve member for closing the controlling clearance by the lower valve stem seal, the maximum relative lift displacement between the valve stem and the closing element being greater than the second relative lift displacement.

7. A cleanable sampling valve as set forth in either of claims 5 or 6 wherein, when the sampling valve is in a closed position, recesses on a lower portion of a circumference of the piston valve bore surround the lower valve stem seal in pressure-locking contact therewith, and when the valve is in its open position, recesses provided over an inner circumference of the spring housing and stuffing box shell surround the upper piston valve seal in pressure-locking contact therewith.

* * * * *